RADIO-ISOTOPE THERMOELECTRIC APPARATUS AND FUEL FORM

Filed July 25, 1963 2 Sheets-Sheet 1

INVENTORS
HAMPDEN O. BANKS
EUGENE T. TEATUM
IAN R. JONES
BY
Roland G. Anderson
ATTORNEY Oct. 17, 1967 H. O. BANKS, JR., ET AL 3,347,711

RADIO-ISOTOPE THERMOELECTRIC APPARATUS AND FUEL FORM

Filed July 25, 1963 2 Sheets-Sheet 2

INVENTORS
HAMPDEN O. BANKS
EUGENE T. TEATUM
IAN R. JONES

BY

ATTORNEY

United States Patent Office 3,347,711

Patented Oct. 17, 1967

3,347,711

RADIO-ISOTOPE THERMOELECTRIC APPARATUS AND FUEL FORM

Hampden O. Banks, Jr., Redondo Beach, Eugene T. Teatum, Berkeley, and Ian R. Jones, Livermore, Calif., assignors, by mesne assignments, to the United States of America as represented by the United States Atomic Energy Commission Filed July 25, 1963, Ser. No. 297,728

8 Claims. (Cl. 136—202)

ABSTRACT OF THE DISCLOSURE

Thermoelectric generator utilizing a heat source including an encapsulated solid form of a radioisotope disposed in a cylindrical heavy metal shield arranged in a reflective heat shield, and insulation to direct heat flow through one flat end of the radiation shield and thermo-junction elements are disposed in a heat conductance path between said flat end of the radiation shield and an exterior shell heat dissipator.

The present invention relates, in general, to apparatus for producing electrical energy by thermoelectric means and, more particularly, to a self-contained thermoelectric generator powdered by a radioactive heat source, to an improved fuel form therefor and to improved thermoelectric elements.

Thermoelectric generator utilizing a heat source includ- producing electrical power under mobile conditions, in isolated installations or in installations such as in subsurface, submarine or space environments wherein servicing is difficult or is not feasible. In the latter types of environments a maximum of reliability, long life and independence from outside fuel supplies or the like are most desirable features. Certain radioactive materials, especially certain fission product isotopes which are obtainable in sufficient quantities and in appropriate concentrations, yield adequate outputs of thermal energy to be considered as fuels for such a thermoelectric generator. Radiostrontium, i.e., strontium-90, was perhaps the first material to be selected as suitable for such an application. The relatively long half-life of this material is an advantage where early fuel replacement is undesirable since long operational life expectancies may be envisaged. However, the cost of energy on a wattage basis is high and the availability of this isotope is limited. Radiocesium, i.e., cesium-137, is a second long-lived isotope which possesses a half-life of similar magnitude to that of radiostrontium with slightly less energy per disintegration. However, by economical utilization of both beta and gamma decay energies, generators using radiocesium as a heat source are feasible and practical on an economical basis. The relatively long half-life of radiocesium does, however, limit power density and corresponding power output for most terrestial applications to below about 60 watts electrical. For many purposes where higher power is needed, a useful life of the order of two years or less is satisfactory wherefore radiocerium, i.e., cerium-144, the only remaining fission product of adequate fission abundance (6.1%) may be used. This material has an attractively high available energy per disintegration (1.34 m.e.v.) and is inexpensive on a curie basis. The half-life of 285 days is suitable for use in generators to be used in missions of less than about two years which half-life being of the order of 1/30 of that of radiostrontium or radiocesium indicates that its power density is about 30 times higher.

The feasibility of utilizing any radioactive source as the "fuel" for generating thermal energy depends in large part upon the provision of suitable fuel forms of the radioisotope. For safety purposes, it is highly desirable that the fuel form be almost completely resistant to leaching to avoid widespread contamination in the event of rupture of containers used in construction of a generator. Cesium-137 may be converted into a satisfactory" polyglass" form, in a process of prior origin, as described in patent application Ser. No. 83,197, now abandoned, hereinafter made reference to, by heating cesium-137 carbonate with low melting alkali metal and alkaline earth oxides as borosilicates with excess boric oxide and silica to above the melting point, e.g., about 800° C. The cooled cast material retains the cesium-137 in a very insoluble state and is otherwise stable, possesses good thermal conductivity and is otherwise satisfactory for use as a thermal energy source. Radiostrontium may be used similarly in the form of radiostrontium ortho titanate. Attempts to provide similar forms of cerium by incorporating cerous oxide into a polyglass matrix were not successful since the cerous oxide appeared to be oxidized to the ceric state. It is most desirable that the compound of material employed as a fuel form contain cerium in the cerous state, which is the same as that of the praseodymium daughter radioactive decay product in order that no gas evolution occurs with continued disintegration. Such gas evolution could produce enormous pressures which would disrup any fuel form and/or container used to enclose same.

The present invention provides a radiocerium fuel form in which the cerium is combined with silicon providing a cerium silicide composition or compound which avoids the difficulties which arise when a compound having a gaseous anion is employed. This fuel form is extremely stable, resistant to leaching with aqueous media and is inert to common reagents, has high thermal conductivity and otherwise has properties which are somewhat unique and are surprisingly advantageous for use as a fuel form for present purposes. Other compounds such as the carbides which also do not have a gaseous anion while desirable from certain operational and fabrication aspects are quite unsatisfactory as to safety considerations since an explosive reaction productive of acetylene can occur on contact with aqueous media. Ceric borides, while not obviously unsuitable, may have undesirable leaching characteristics particularly with increases in the number of boron atoms attached. The invention also provides structural arrangements and combinations of components, as well as certain improved thermoelectric and other components, whereby the full potential of the novel fuel form of the invention, as well as of other radioactive fuel forms and thermoelectric apparatus, may be realized as will be set forth more fully hereinafter.

Accordingly, it is an object of the present invention to provide thermoelectric generator apparatus and components for use in said generator apparatus.

Another object of the invention is to provide new radioactive isotope fuel forms for use in thermoelectric generator apparatus.

Still another object of the invention is to provide a fuel form of radiocerium wherein the cerium is present as a silicide compound for use as a source of thermal energy in thermoelectric generator apparatus or the like.

A further object of the invention is to provide thermoelectric generator apparatus especially adapted for use with a radioisotope fuel form.

A still further object of the invention is to provide improved structural arrangements and component elements in a radioisotope fueled thermoelectric generator.

Another object of the invention is to provide improved thermocouple or thermoelectric elements for use in converting thermal energy into electrical energy.

The invention possesses other objects and advantages which will become apparent by consideration of the following description and drawing accompanying and forming part of the specification of which drawing.

In brief, the thermoelectric generator of the invention includes as essential elements a heat source including a concentrated quantity of a radioactive fuel form which is suitably jacketed to provide primary containment which fuel form is surrounded by a thermally-conductive heavy element radiation shield to confine radiation to below hazardous levels and to convert incident radiation into thermal energy. Such shielded radioactive heat source is disposed in thermal insulation and reflective heat shield especially adapted to concentrate the heat flow from said heat source along a well-defined path and to minimize extraneous heat losses. Thermoelectric generator elements of conventional or of preferred constructions disclosed hereinafter are disposed in parallel heat conductivity relation between a heat accumulator and a heat sink or dissipator in said well-defined heat flow path whereby electrical potentials are developed therein and may be conducted externally by appropriate series, parallel or series parallel connection of the output terminals. Accessory equipment such as D.C.-D.C. convertors, invertors, appropriate connectors, housings suitable for operating in various environmental conditions, and the like are also provided.

Figure 1:
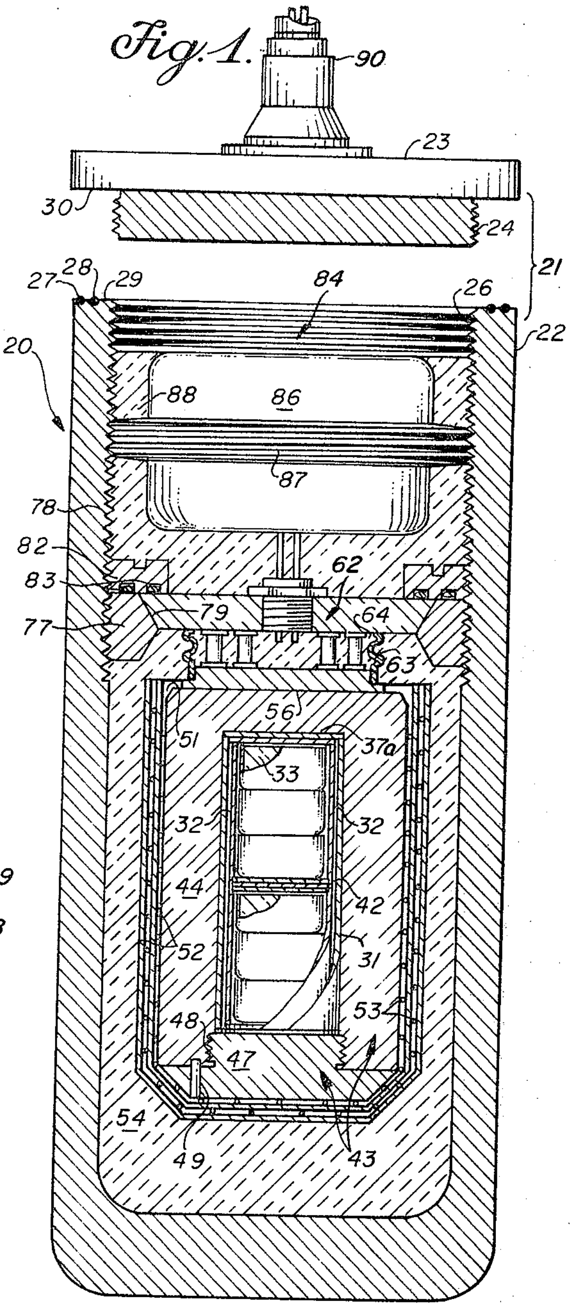
FIGURE 1 is an elevational view with portions shown in section to illustrate internal structural details of a thermoelectric generator constructed in accordance with the invention.

More particularly, as adapted for use in a wide variety of environments including the highly demanding conditions of deep sea locations, the thermoelectric generator 20 of the invention as shown in FIGURE 1 of the drawing is housed in a heavy-walled, corrosion-resistant, thermally-conductive exterior pressure shell 21 which may serve as the final heat sink or radiator of the generator. The shell 21 may take the form of a lower elongated cylindrical receptacle portion 22 provided with a closure cover 23 which is secured by engagement of threads 24 provided on a lower plug portion thereof with the threaded internal end wall section 26 of the receptacle 21. Effective sealing of the chamber defined by said shell 21 is provided by O-rings 27 seated in annular grooves 28 provided in the end surface 29 of the wall of receptacle 22 against which an outwardly flanged rim surface 30 of closure cover 23 abuts in the fully engaged position of said cover. Highly satisfactory materials for constructing shell 21 are the corrosion resistant aluminum alloys such as the 7075–T series, preferably alloy 7075–T6 which has a thermal conductivity of 111 B.t.u./hr./ft.$^2$/° F./ft., as identified under the headings "Wrought Alloys" variously throughout "Alcoa Structural Handbook," copyright 1956, by Aluminum Company of America. Thermal conductivity and heat transfer to exterior invironments are still adequate, e.g., under aqueous immersion conditions even with a thin corrosion-resistant coating of a fluorinated polymeric material such as Teflon or other durable resistant coating applied to the exterior. Heat radiation can be improved, e.g., for space or other environment of low heat acceptance capability or if a large thermal flux is encountered as in large generator units by providing exterior ribs and/or dark surfaces on said shell or by utilizing heat transfer equipment in accordance with accepted design practice. It is advantageous that said shell be operated at low temperatures commensurate to provide the most efficient heat rejection factor.

Figure 2:
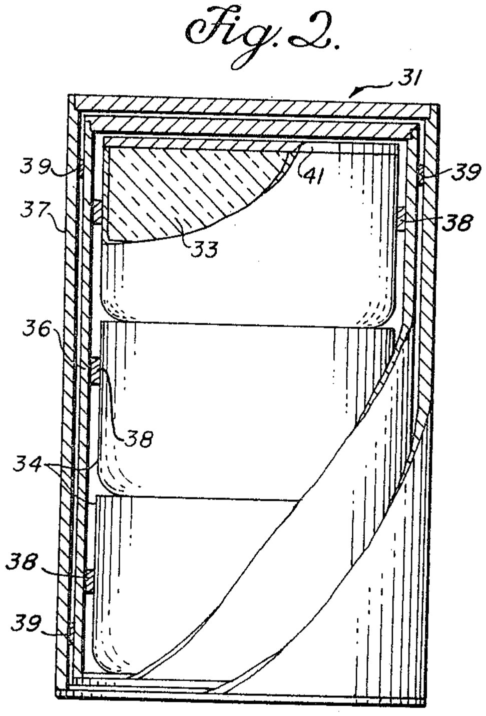
FIGURE 2 is an elevational view partly in section showing canned radioactive fuel increments of the generator of FIGURE 1.

A radioactive heat source 31 is disposed in the lower portion 32 of the aforesaid chamber of shell 21. Heat source 31 generally comprises a dense, insoluble, thermally-conductive composition or compound of one or more radioisotopes appropriately encapsulated to minimize hazards arising from any residual solubility, corrosion susceptibility, etc., of the fuel form in a compact geometrical configuration. For convenience, particularly to facilitate fabrication which may be complicated by the very high radiation output of the radioisotopes, the heat source may be constructed with the fuel form divided into a plurality of truncated cylindrical fuel form increments 33. For example, using a polyglass form of radiocesium, suitable increment containers such as platinum cups 34 may serve for the fusion and casting of said increments 33 as may best be seen in FIGURE 2. Double closely-dimensioned nested clodding shells or cans 36 and 37, e.g., of a highly corrosion nickel alloy such as Hastelloy C are welded or otherwise sealed to hermetically enclose several of such fuel increment cups 34 and protect such, e.g., against anodic corrosion of the cup material. Spacers 38 of the order of 0.060" are disposed between cups 34 and inner can 36 and similar spacers 39 of the order of 0.030" are disposed between the sides of inner and outer cans 36 and 37, respectively, to accommodate differential thermal expansion and avoid thermal stress. A spacer 41 may be disposed between the upper increment 34 and top of can 36 for similar purposes. If more than a few fuel increments are used several of the increments, e.g., three, may be assembled as above in an inner can 36 and a single elongated can **37*a* used to enclose several of such assemblies as shown in FIGURE 1 with an intermediate partition 42** between such assemblies. The fuel form used in said increments may be strontium ortho-titanate, a cesium polyglass as disclosed in the application of Hampden O. Banks, Jr., et al., Ser. No. 83,197, filed Jan. 17, 1961, now abandoned, or, preferably, for use missions of up to about two years, radiocerium in the silicide composition form described more fully hereinafter.

The heat source also includes a heavy element, preferably a heavy metallic element radiation shield 43 which also serves to convert energetic radiation from said fuel into thermal energy and as being a heat conducting element. Depleted uranium is a material preferred for such purpose as being most efficient and requiring a minimum of material; however, other heavy metals such as dense tungsten can be used if space conservation is not unduly critical. Radiation shield 43 may be provided as a cast heavy walled body 44 having an open-ended cylindrical cavity into which the aforesaid canned fuel elements are fitted. A closure cap 47 may be secured to close the end of cavity as by means of threaded portion 48 and by insertion of locking pins 49, one only shown, in mating bores formed in said cap and body.

As a result of considerable investigation, it was determined that conductive and particularly radiant heat losses dominated the various possible heat loss mechanism operating to transfer heat extraneously from the heat source to the shell. These losses occurred at highly prohibitive rates under conditions applicable herein, i.e., heat source at above about 450° C. and shell heat sink at ambient, i.e., 22±2° C., temperatures. Effective reduction of heat loss from the sides and bottom of the exterior surface 51 of shield 43 is obtained by providing a high radiant heat reflectivity plating or cladding on the surface 51, e.g., nickel or gold, and by providing a plurality of thin wall thermal shield members 52 spaced outwardly therefrom. The various members and surfaces are separated from each other as by means of staggered spun glass cords 53 which diminish conductive losses and to some extent convective circulation. Inner and outer surfaces of wall members 52 are also provided with radiant heat reflective cladding similar to that of surface 51 which cladding is preferably a material such as gold which has superior reflective qualities. Two reflective shield wall members with both sides plated are ordinarily adequate to provide an effective thermal shield. Conductive heat losses from the heat source through the thermal shield is further minimized by providing felted fiber glass insulation 54 between the outermost thermal shield member 52 and shell portion 22. AA Felted Fiberglas or an equivalent material is satisfactory for the stated purpose when used in thicknesses of the order of 1 to 2 inches. With the foregoing arrangement of heat shield and insulation, heat loss from the sides and bottom of said heat source is minimized to easily tolerated levels and the major fraction of the heat, i.e., of the order of 80 to 90% may be made to flow upwardly through the open end region of said thermal shield and is therefore available at the upper surface 56 of the radiation shield 44.

Figure 3:
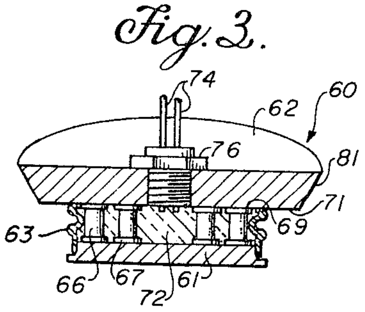
FIGURE 3 is a side view partly in section illustrating the thermoelectric power conversion module or assembly used in the generator of FIGURE 1 of the drawing.

A power conversion assembly 60 illustrated in detail in FIGURE 3 of the drawing is mounted above the heat source 32 in the shell portion 22 to complete the heat conductive path between the upper end surface 56 of the radiation shield 44 and exterior shell 22 as shown in FIGURE 1. Assembly 60 includes a copper or other good thermal conductor heat accumulator plate 61 of a size effective to intimately contact in heat transmissive relation a substantial portion of shield surface 56. A circular heat dissipator plate 62 of a similar material, e.g., copper, but of larger diameter is disposed in parallel spaced relation coaxially above accumulator plate 61 with a bellows 63, i.e., extensible, convoluted, flexible sleeve of stainless steel disposed between peripheral portions of plate 61 and the lower surface of plate 62 defining a truncated circular chamber 64 therebetween. A plurality of thermocouple or thermoelectric generator elements 66 of conventional design or of preferred designs described more fully hereinafter are disposed in chamber 64. The hot junction portions 67 of elements 66 are disposed in electrically insulated good heat transfer relation thereto. The cold junction portions 69 of elements 66 are disposed in similar relation to the lower side surface 71 of dissipator plate 62 whereby a high thermal gradient exists between said hot and cold junction portions of the thermoelectric elements in order that the optimum power generation is obtained therein. Unless all of the thermoelectric elements are to be operated in electrical parallel, as well as in a parallel thermal gradient, electrical insulation in the form of a thin mica sheet and/or an insulating ceramic cement layer (not shown) is interposed between the hot and cold junctions and the accumulator and dissipator plates, respectively. Also, a thin nickel protective sheet (not shown) may be secured to the upper heat accumulator plate surface and attached peripherally to said stainless steel bellows 63. Thermal insulation 72 is disposed in all unoccupied portions of chamber 64 to minimize extraneous heat transfer thereacross.

Thermoelectric elements of the lead telluride type or the equivalent are preferably employed. Paired n and p lead telluride thermoelectric elements in which the n and p elements are of substantially coextensive parallel length are especially preferred due to higher voltages attainable and improved efficiency. Jumper leads (not shown) are used to couple the terminal junctions of said elements 66 in series, parallel or other appropriate relation and to leads 74 of a connector plug 76 mounted in the central portion of dissipator plate 62.

An annular member 77 mounted by means of threads 78 disposed on the inner wall surface of shell 22 is provided with a beveled inner edge surface 79 to afford a means for mounting the power conversion assembly 60. The outer edge surface 81 of dissipator plate 62 is beveled to mate intimately in good heat transfer relation with ring surface 79. A peripherally threaded retainer ring 82 is engaged with threads 78 and tightened to cause O-ring seal members 83 disposed in concentric grooves in the lower side of ring 82 to bear upon the upper surfaces of member 77 and dissipator plate 62 at each side of the juncture line therebetween to seal the lower portion of chamber 27 from an upper chamber portion 84.

The upper chamber portion 84 may be utilized as a repository for equipment powered by the generator or utilized for mounting electrical current or voltage modifying components if desired in the event that the power output of the generator need be modified for more effective utilization. For example, a D.C.-D.C. convertor 86 disposed in a sealed container might be mounted by means of a peripheral threaded ring 87 provided on the outer surface of said container engaged with threads 78. The input thereof is connected to leads 74 to convert the delivered power to a higher voltage at the generator output terminal plug 90 provided in the cap 23 of shell 21. Compact motor generator invertors or preferably a solid state convertor using transistors, voltage step up induction devices and semiconductor diode rectifiers of conventional design may be so employed. Silver cadmium batteries may be disposed therein to be charged to deliver intermittent heavy currents to a load or the generated current may be fed unmodified to the output terminal plug 90. Thermal insulation 88, e.g., felted fiberglass, is used to fill any voids in chamber 84.

A thermoelectric generator of the foregoing construction designed for deep sea and other rigorous environment with a 5 watt continuous output over a period of years may have the following dimensions for depths up to 20,000 ft. and operating parameters:

| | |
|---|---|
| Shell overall length (Aluminum Alloy 7075–T6) | 30.5 in. |
| Shell outside diameter | 13.5 in. |
| Shell cavity length | 25 in. approx. |
| Shell cavity diameter | 9.5 in. approx. |
| Sidewall thickness | 2 in. |
| Endwall thickness | 3.5 in. |
| Fuel can O.D. | 2.85 in. |
| Fuel can length (6 increments) | 8.75 in. |
| Depleted uranium shield length | 13 in. |
| Depleted uranium shield O.D. | 7.07 in. |
| Depleted uranium shield thickness | 2.1 in. |
| Fuel form platinum cup O.D. | 2.5 in. |
| Fuel form platinum cup depth | 1.25 in. |
| Insulation sidewall thickness | 1.25 in. approx. |
| Hastelloy can | 1/16 in. |
| Fuel mass cesium-137 polyglass* | 1,687 grams. |
| Fuel volume | 563 cc. |
| Cesium-137 curie strength | 25,500 – 28,000 curies. |
| Specific activity (cesium metal) | 35.15 curie/g. |
| Power activity cesium-137 | 4.75 watts/kilocurie. |
| Power density of fuel | 0.215 watt/cc. |
| Nominal temperature of heat source | 1000° F. approx. |

| | |
|---|---|
| Power output with converter | 12 v. |
| Power output (open circuit—about 18 PbTe elements in series) | 3.5 v. approx. |
| Thermocouple efficiency (PbTe) | 6% approx. |
| Thermocouple operational temp. hot junction | 450–500° C. |
| Thermocouple operational temp. cold junction | 90° C. |

*Fuel composition polyglass $Cs_2CO_3$ 50% (wt.), silica 47.5% (wt.), borosilicates 2.5% (wt.) admixture fused at 700° C. or above to a density of 3.00±0.2 g./cc.

Figure 4:
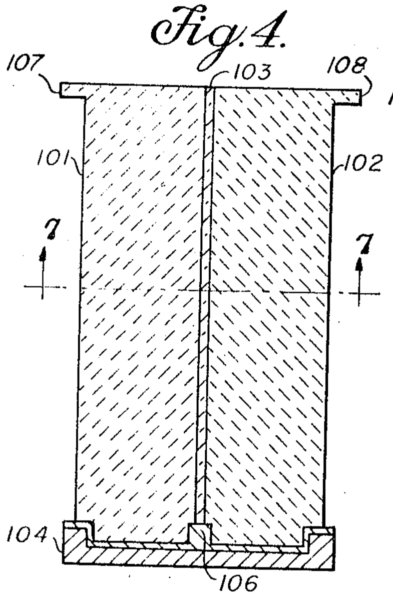
FIGURE 4 is a longitudinal cross-sectional view of thermoelectric generator elements as employed in the power conversion module of FIGURES 1 and 3.

Thermoelectric elements 66 are constructed as may best be seen by reference to FIGURE 4 of the drawing of paired half-cylindrical "n" and "p" thermoelectric material elements 101 and 102, e.g., of lead telluride, respectively, which are separated except for a short length at the lower end by a ceramic insulator or insulating cement layer 103. Lower peripheral end regions of the elements 101, 102 are stepped in order that a cup shaped shoe 104 of an electrical and heat conductive material such as Armco iron which is inert to the thermoelectric material may be attached as by means of tin telluride solder to provide a hot junction electrical connection between said elements 101, 102. The tin telluride may also be applied in a short region 106 at the lower end of the gap between said elements. Outwardly flanged lip portions 107, 108 of elements 101, 102 respectively may serve as electrical terminals to couple said elements into desired circuits as by means of jumper leads 73 as described above. An alternative means for connecting such elements utilizing a printed circuit board is set forth hereinafter.

Figures 5, 7:
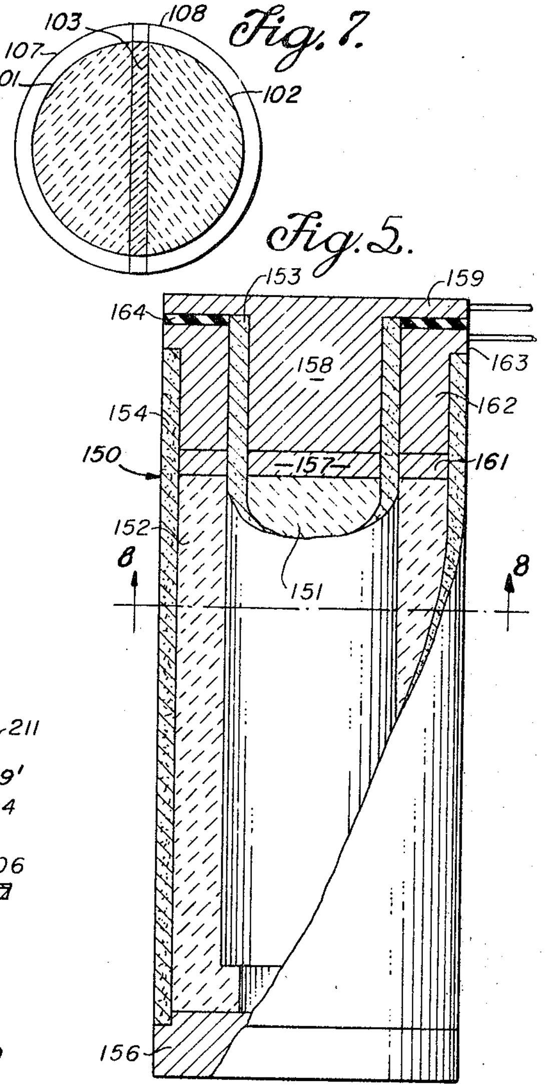
FIGURE 5 is a longitudinal cross-sectional view of a second thermoelectric element constructed in accordance with the invention.
FIGURE 7 is a cross sectional view taken along the plane 7—7 of FIGURE 4.

Another embodiment 150 of a thermoelectric element which may be employed in the generator of the invention is illustrated in FIGURE 5 of the drawing. As shown therein a cylindrical core 151 of p-type thermoelectric material such as "p" type lead telluride is disposed concentrically within an annular cylindrical tube 152 of a similar n-type thermoelectric material, e.g., "n" type lead telluride with an interposed cylinder 153 of ceramic insulator material which projects beyond the upper end of concentric elements 151 and 152. A cylindrical shell 154 of ceramic insulation is disposed to enclose the exterior surface of element 152 and project beyond said upper end of elements 151 and 152 defining a truncated annular chamber with insulator cylinder 153. At the lower end a circular disk heat conductor shoe 156 of material inert to said thermoelectric elements such as Armco iron is joined, e.g., by soldering the upper surface thereof in contact with the lower ends of core element 151 and concentric element 152 with tin telluride. Shoe 156 extends outwardly to engage and close the lower end of insulator shell 154. A protective separator plate 157, e.g., of Armco iron, is disposed in the upper end of insulator cylinder 153 to abut against the upper end of core element 151 and an adaptor plug 158 of copper or like conductor is disposed in contact with the upper surface of said plate to provide an electrical current and heat conductive path. An outwardly flanged terminal portion 159 of said plug 158 serves to close the upper end of shell 154 and provide a negative terminal for coupling electrical conductors to the core element 151. An annular protective washer 161 is disposed in the annular chamber between insulators 153, 154 to abut against the upper end of element 152 and an annular adaptor sleeve 162 abuts thereagainst and terminates outwardly in a flanged lip 163 to provide a positive terminal for connecting to the thermoelectric element 152. Insulation washer 164 separates the upper end of sleeve 162 from the lower surface of the flanged portion 159 of plug 158.

Figure 6:
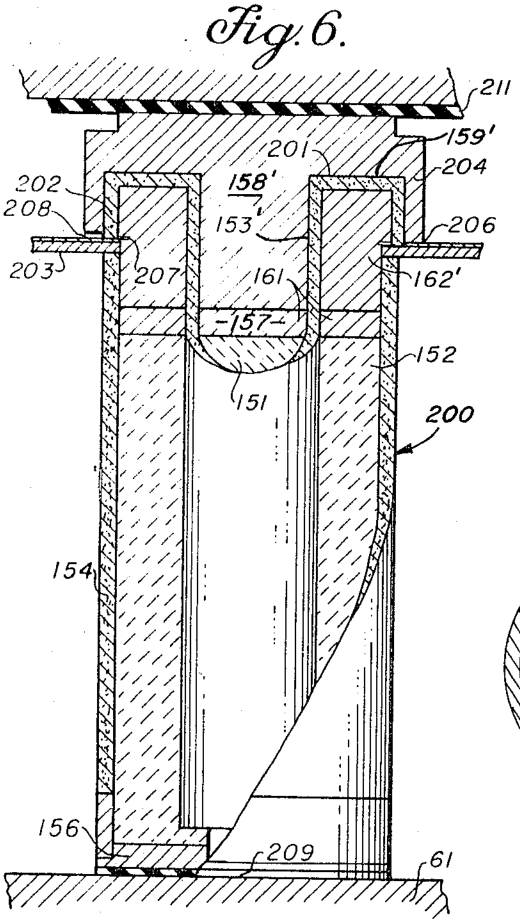
FIGURE 6 is a longitudinal cross-sectional view of a third thermoelectric element embodiment similar to that of FIGURE 5 as modified to use a printed circuit connector board.
Figure 8:
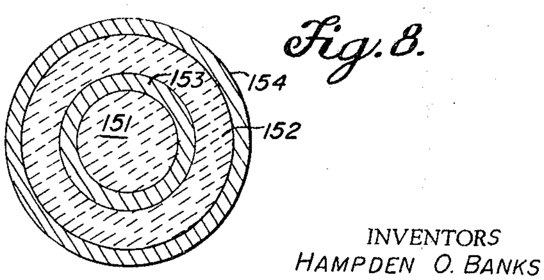
FIGURE 8 is a cross sectional view taken along the plane 8—8 of FIGURE 5.

Element embodiment 150 may be modified as shown in FIGURE 6 to provide a third themoelectric element 200 adapted for convenient assembly. Similar components are indicated by similar reference characters in FIGURE 5 and FIGURE 6. Elements shown in FIGURE 6 modified to provide the modified electrical terminal connection structure at the upper end of thermoelectric element 200 are indicated by prime reference numerals. In embodiment 200 insulation washer 164 is eliminated and ceramic insulator 153' is extended as a flanged shoulder 201 and a depending skirt portion 202 above the upper and about exterior surfaces of adaptor sleeve 162' to abut against a printed circuit board 203 interposed in contact with the upper end of ceramic sleeve 154'. The outwardly flanged portion 159' of plug 158' is provided with a downwardly depending skirt portion 204 which terminates a short distance above board 203 to abut and be joined as by soldering to a contact area 206 of a first circuit conductor element (shown fragmentarily) provided on the upper surface of said board. Inwardly of depending insulator skirt 202 a similar peripheral contact area 207 disposed oppositely to area 206 is provided between a second conductor element and adaptor sleeve 162'. A gap 208 is provided between coextensive areas of the second conductor element and depending skirt 204 for insulation purposes. An appropriate number of elements 200 is disposed upon said circuit board with said conductors being disposed to provide appropriate series, parallel or series parallel connections (not shown) for current and voltage requirements at the leads 74 of connector plug 76. Electrical insulation 209 such as thin mica sheet is provided between heat accumulator 61 and shoe 156. A ceramic insulation cement layer 211 may be disposed between adaptor plug 158' and dissipator plate 62, as well as between upper surfaces of board 203 and dissipator plate 62.

Lead telluride thermoelectric materials are available from a commercial source which have the following characteristics:

| | Positive Element "p" | Negative Element "n" |
|---|---|---|
| Max. Seebeck Coef., μv./° C. | 286/440 | 262/425 |
| Max. resistivity, milliohm/cm. (° C.) | 5.9/10 | 5.5/595 |
| Min. thermal conductivity, watts/cm. ° C. | 0.0125/460 | 0.0148/500 |
| Figure of merit (Z)×10⁻³/° C. | 0.141/260 | [1] 1.93/95<br>[2] 0.51/600 |

[1] Max. [2] Min.

Other lead telluride materials, i.e., $(GeTe)_{0.95}(Bi_2Te_3)_{0.05}$ "p" type and PbTe+0.10% Bi "n" type materials are disclosed in the "Westinghouse Research Laboratory Progress Report" to the U.S. Navy BuShips Contract No. NOBS–84317 by Westinghouse Electric Corporation, Lima, Ohio, Division. Couples of this material ¼ inch square and 1 inch long are capable of about 0.195 watt/couple and 39 couples yield an open circuit voltage 6.4 volts with cold and hot junction temperatures of 50 and 500° C., respectively.

The cerium silicide fuel form of the invention is produced in reactions in which radio-ceric oxide which is generally provided as 10 to 15% or more of Ce-144 metal content from the processing of nuclear reactor fuel processing waste material is used as the cerium source. Two general type reactions may be employed as follows:

$$(1)\qquad 4Si + CeO_2 \xrightarrow[\text{heat}]{\text{argon atmos.}} CeSi_2 + 2SiO$$

$$(2)\qquad CeO_2 + 2SiO_2 \xrightarrow{2100°\text{K.}} CeSi_2 + 3O_2$$

The first is preferred since high purity silicon metal is more easily attainable than is pure $SiO_2$ and impurity content must be minimized to obtain the highest resistance to leaching. Also, the lesser volume of gas evolved, i.e., one molecule of SiO as compared to three molecules of oxygen is most desirable since losses due to spattering caused by gas evolution are minimized and the tendency towards gas occlusion is reduced.

As normally practiced, cerium oxide is contacted with molten silicon metal, e.g., by heating an admixture of the finely-divided materials. As the silicon metal becomes molten the reaction with ceric oxide is initiated. The reaction is highly exothermic and the temperature must be closely controlled once the reaction is initiated to prevent losses of cerium by vaporization and to minimize damage to crucibles utilized to contain the charge. Induction heating or resistance furnaces may be used to obtain the necessary temperatures. The preparation of dense massive solid forms of cerium silicide involves a two-stage heating operation. The formation of cerium silicide occurs at relatively low temperature of below 1600° C. but the product is porous and contains occluded SiO gas with the product density being of the order of 3.5–4.5 g./cc. If the foregoing product is heated rapidly to above the melting point of the silicide (1900° C.) the gas is evolved and a product of about 6 g./cc. density is produced. The reaction mixture tends to react with most refractory crucible materials. Recrystallized high-purity alumina crucibles appear to be the most suitable and heating rapidly to temperature usually produces the most satisfactory products. Vacuum conditions encourage vaporization losses, as well as crucible damage, and are not advisable. An inert gas, e.g., helium or argon atmosphere produces best results. Graphite crucibles and the method of operation disclosed in the copending application of Eugene T. Teatum, Ser. No. 296,145, entitled "Crucible Reactor and Process," filed July 18, 1963, now U.S. Patent No. 3,332,741, issued July 25, 1967, may also be utilized to produce the radio-cerium silicide fuel form or non-radio-active cerium silicide for various purposes, e.g., semiconductor and thermoelectric elements as set forth hereinafter.

Other suitable processes capable of producing radio-cerium silicide fuel forms and cerium silicide materials in general involve the controlled heating of reaction mixtures of ceric oxide and silicon metal. Small charges, i.e., of the order of 10 grams of ceric oxide and silicon metal in stoichiometric proportions are disposed in a graphite crucible. The graphite crucible is then disposed in an outer protective cup member with intervening graphite powder to improve R.F. coupling and with an elongated chimney provided to prevent ingress of graphite powder into the crucible. The aforesaid assembly is disposed in an argon filled chamber of an R.F. induction heating furnace which may be at an initial temperature of the order of 1000° C. and the temperature is raised incrementally at intervals of a few minutes while observing the temperature rise with an optical pyrometer. Gas evolution begins at temperatures of the order of 1100–1200° C. and the temperature is maintained constant until gas evolution ceases. The temperature is then raised to 1500° C. to melt silicon metal and complete the reaction and is then slowly raised to 1950° C. to completely fuse the product and the material is then allowed to cool. In a typical operation using a 10 g. charge (6.12 g. $CeO_2$+4.0 g. Si) of non-radio-active materials the foregoing procedure was completed in a two-hour period and a very dense, i.e., specific gravity of 6.2 g./cc. product was obtained. In some instances, particularly with larger charges, a blue flash is noted which indicates an almost explosive reaction rate and the product obtained is porous, but the cerium silicide itself is of high density. Products having apparent densities of 4 to 5 g./cc. are formed under such conditions. However, such lower density products may be densified by heating to fusion temperatures and by powder metallurgy techniques in which fragmented porous material is compacted under high mechanical pressure and heating to sintering or fusion temperatures, i.e., 1750 to 1900° C. and about 1950° C., respectively.

Larger charges may be processed in alumina crucibles, particularly, high purity recrystallized alumina crucibles. Such crucibles are disposed in a graphite boat supported upon an alumina platform and heated, e.g., in a high temperature molybdenum element resistance furnace. To protect such heating elements 5% hydrogen is mixed with the argon used in the heated chamber at about atmospheric pressure. Charges of 40.55 g. (proportions as above) are introduced at an initial temperature of the order of 1000–1100° C. and the temperature is raised in 5% increments every 20 minutes to temperatures in the range of 1450 to about 1600° C., and preferably above. The material is maintained at the final temperature for a time period of ½ to 1 hour and is then cooled. Products with apparent densities in the range of 3.2 to 4.0 are usually obtained and several batches of the product may be combined, densified and compacted to produce a fuel form compact increment disposed, e.g., in an alumina shell or noble metal cup as above.

Cerium-144 decays with a half-life of 285 days to praseodymium-144, with a half-life of 17 minutes, which in turn decays to neodymium-144 which has a half-life of $5\times10^{15}$ years and is stable. Accordingly, the energy of each cerium-144 disintegration is the overall decay energy in going to neodymium-144, i.e., 1.34 m.e.v. per disintegration or $7.93\times10^{-3}$ watts/curie of $Ce^{144}$. With 10% $Ce^{144}$ in the cerium metal content of the original ceric oxide and no occluded SiO in the product, the foregoing connotes a specific power of 2.06 watts/gm. of $CeSi_2$ or 12.4 watts/cm.$^3$ of fuel for material of a density of the order of 6 gm./cm.$^3$.

The reaction product of cerium and silicon either radioactive or natural is a complex material. In addition to $CeSi_2$ several other intermetallic compounds are formed. Ceric silicide is a definite compound heretofore, apparently not obtained in massive form, having a reported body-centered tetragonal structure which melts at 1430° C. The phase diagram for the cerium-silicon compound family includes besides $CeSi_2$ intermetallic compounds such as CeSi, $CeSi_{0.75}$, $Ce_2Si$, $CeSi_{0.35}$, and others. It is difficult to assign definite chemical formulae for such compounds since all exhibit the same tendency to form solid solutions with adjacent phase materials yielding regions of homogeneity. It appears that Dalton's law of multiple proportions is not followed and that fractional valences exist. The varigated crystal structure is illustrated by the values of hardness found as determined by the Vicker's diamond pyramid hardness test (VD HP). For bright portions of micrograph sections hardness ranges from 1064 to 1480 (VDP) (Rockwell>70 Rc) to 287 VDP (28 Re) for lighter portions. The harder sections ($CeSi_2$) are therefore harder than many semi-precious stones. The electrical resistivity of the non-radioactive cerium silicide material was measured using a small linearly spaced four prong voltage divider type sensor of known prong spacing in which a known voltage is applied across the outside prongs and the divided voltage is measured between the two inside prongs. Values of 0.016 to 0.019 (average 0.018) ohm-cm. were obtained, but these values are believed to be low due to extraneous conductivity through slag. Thermal conductivity of a sample having a specific gravity of 4.34 was determined by the method of Carslow, H. S. and Jaeger, J. C., "Conduction of Heat in Solids," Oxford, Clarendon Press, 1959, 2nd edition. It was found that the heat capacity of Ce— was 0.051 cal./g. to 100° C. and that of Si—, 0.21 cal./g. to 900° C. The radio-cerium silicide fuel form is extremely resistant to leaching of the cerium therefrom by water and common reagents, i.e., bases and acids, as determined by analytical and tracer techniques. This characteristic coupled with adequate heat conductivity and other properties qualify the silicide product as an excellent fuel form of radiocerium.

When cerium silicide is prepared in certain types of domestic alumina crucibles, e.g., Coors, or if alumina ($Al_2O_3$) is added in proportions set forth in the table presented hereinafter and fusion occurs at certain temperatures, thermoelectric semi-conductor materials are formed. A charge of 20 g. $CeO_2$ and 12.7 of Si was heated in an alumina crucible to about 1100° C. for 1 hour whereupon a low strength, porous material of silvery lustre was formed. Similar charges heated to 1400° C. gave a dense hard material. Reheating to 1560° C. melted the material to a puddle with the evolution of heat and vapor. Analysis of the low temperature material, identified as Sample A and of the high temperature material, Sample B, are presented together with other data in the following table:

TABLE

| | Samp'e A, Low Temp. | Sample B, High Temp. |
|---|---|---|
| So'u'ble Portion on An ilysis: | | |
| Ce | 18.4% wt | 58.8% wt. |
| Al | 22.5% wt | 7.8% wt. |
| Si | 36.3% wt | 5.6% wt. |
| Total solub'e | 77.2% wt | 72.2% wt. |
| Portion insoluble after 4 hours $Na_2CO_3$ fusion: | | |
| Ce | 9.1% wt | 23.6% wt. |
| Al | 5.1% wt | 2.7% wt. |
| Si | 8.6% wt | 1.5% wt. |
| Total insoluble | 22.8% wt | 27.8% wt. |
| Compound in Ce matrix | $Al_3Si_2$ | $Al_2Si_3$. |
| Tracer elements | Ta, Ag, Pd, Yt | Ta, Ag, Pd, Yt. |
| Thermoelectic property | "n" type | "p" type. |
| Suggested structure | -Al-Si-Al-Si-Al- | -Si-Al-Si-Al-Si-. |

As indicated above, Sample A is considered to have an $Al_3Si_2$ structure and Sample B an $Al_2Si_3$ structure. The large evolution of heat in going from "A" to "B" may indicate formation of a double bonded pentamer from the (—Al—Si—) infinite matrix. Cerium aluminides may be present in the material and the material is of considerable complexity as may be observed from the analyses and possible compound forms present. In the foregoing, it may be noted that the alumina addition serves as a "dopant" and that the stability of such a dopant at high temperatures coupled with either properties of the cerium silicide are those which are to be desired in a good thermoelectric generator element. Thermoelectric generator elements may be fabricated from the "n" and "p" doped ceric silicides described above by fusion and sintering techniques similar to those used with the lead telluride elements discussed above and used as disclosed in the foregoing.

While there has been described in the foregoing what may be considered to be preferred embodiments of the invention, modifications may be made therein without departing from the spirit of the invention and it is intended to cover all such as fall within the scope of the appended claims:

What is claimed is:

1. A thermoelectric generator comprising:

(a) a dense insoluble solid fuel form material including an energetic gamma emitting radioisotope selected from the group consisting of strontium-90, cesium-137 and cerium-144;

(b) a metallic cladding disposed in heat conductive relation to enclose said fuel form material;

(c) a generally cylindrical radiation shield having a planar end face and defining a cavity, the walls of which are in close-fitting heat conductive relation to said cladding of said fuel form, said shield constructed of a heavy metal selected from the group consisting of tungsten and depleted uranium so as to absorb and convert the energetic radiation emitted by said radioisotope into heat therein; said shield having a polished reflective metal surface plating to minimize radiative heat loss therefrom;

(d) a radiant heat shield including at least two coextensive polished thin wall heat reflective metallic members supported in insulated spaced concentric relation, and with the innermost member in spaced insulated relation to said radiation shield, said radiant heat shield defining an opening coextensive with said planar end face of said radiation shield and otherwise enclosing said radiation shield so that flow of heat conducted from said fuel form and produced in said shield is concentrated at said planar end face;

(e) thermal insulation disposed outwardly from said heat shield;

(f) generator means including thermoelectric elements having hot junction portions disposed in heat conductive relation with said planar end face, and cold junctions extending outwardly therefrom; and (g) heat dissipator means arranged in heat conductive relation with the cold junction portions of said generator elements, establishing a thermal gradient therein to generate an electrical potential therein.

2. Apparatus according to claim 1, wherein said generator means comprises an assembly of a heat accumulator plate in thermal contact on one side with said planar radiation shield end face, and on the other side with said hot junctions of the thermoelectric elements; a heat dissipator plate with one side in thermal contact with the cold junctions of said thermoelectric elements and with a peripheral portion in heat conductive relation with said heat dissipator means.

3. Apparatus according to claim 2, wherein there is provided an exterior pressure shell adapted to dissipate heat to the surrounding environment, and defining a chamber at one end wherein said clad fuel form, radiation shield, radiant heat shield, thermal insulation and generator means assembly is disposed, and wherein said heat dissipator plate is in peripheral engagement with said exterior shell.

4. A thermoelectric generator as defined in claim 3 wherein said fuel form material is strontium-90 orthotitanate.

5. A thermoelectric generator as defined in claim 3 wherein said fuel form material is cesium-137 polyglass.

6. A thermoelectric generator as defined in claim 3 wherein said fuel form material is cerium-144 silicide.

7. A thermoelectric generator as defined in claim 3 wherein said thermoelectric generator elements are lead telluride thermocouple units.

8. A thermoelectric generator as defined in claim 3 wherein said heat dissipator plate extends transversely across said chamber defining a chamber portion in the second end of said shell, electrical power modifying and storage means are disposed therein which are connected to the conductor means of said assembly, and conductor means are connected to the output of said power modifying and storage means and leading exteriorly of said shell.

References Cited

UNITED STATES PATENTS

| | | | |
|---|---|---|---|
| 833,427 | 10/1906 | Tone | 23—204 |
| 2,671,817 | 3/1954 | Groddeck | 136—202 |
| 2,913,510 | 11/1959 | Birden | 136—202 |
| 3,057,940 | 10/1962 | Fritts | 136—233 |
| 3,075,030 | 1/1963 | Elm et al. | 136—208 |
| 3,088,900 | 5/1963 | Brown et al. | 23—204 X |
| 3,124,538 | 3/1964 | Lewis | 252—301.1 |
| 3,125,860 | 3/1964 | Reich | 136—203 |
| 3,214,295 | 10/1965 | Danko et al. | 136—202 |

FOREIGN PATENTS 899,464 6/1962 Great Britain.

OTHER REFERENCES

Samsonov et al.: "Electrical Conductivity of Transition Metal Silicides," in Chemical Abstracts, 1961.

ALLEN B. CURTIS, *Primary Examiner.*